United States Patent [19]
Walker

[11] 4,421,534
[45] Dec. 20, 1983

[54] TOWER FOR REMOVING ODORS FROM GASES

[75] Inventor: James D. Walker, Aurora, Ill.

[73] Assignee: Welles Products Corporation, Roscoe, Ill.

[21] Appl. No.: 690,004

[22] Filed: May 26, 1976

Related U.S. Application Data

[63] Continuation of Ser. No. 482,484, Jun. 24, 1974, abandoned.

[51] Int. Cl.³ .......................... B01D 53/18; C02F 3/04
[52] U.S. Cl. ............................................ 55/73; 55/89; 55/93; 55/233; 210/150; 210/617; 210/756
[58] Field of Search ................... 55/73, 84, 89, 93, 94, 55/223, 226–229, 233, 257; 210/17, 60, 150, 151, 199, 284, 290; 261/21, 29, 151

[56] References Cited

U.S. PATENT DOCUMENTS

| | | | |
|---|---|---|---|
| Re. 18,967 | 10/1933 | Brandt | 210/150 X |
| 342,151 | 5/1886 | Walls | 210/284 X |
| 2,073,441 | 3/1937 | Blunk | 210/15 |
| 2,200,580 | 5/1940 | Pruss et al. | 210/150 X |
| 2,308,866 | 1/1943 | DeKema | 210/17 |
| 2,560,978 | 7/1951 | Persson et al. | 210/60 |
| 2,598,116 | 5/1952 | DuBois | 55/94 X |
| 3,293,174 | 12/1966 | Robjohns | 210/17 |
| 3,589,518 | 6/1971 | Brebion et al. | 210/150 |
| 3,695,004 | 10/1972 | DeLisio et al. | 55/225 |
| 3,828,525 | 8/1974 | Copa et al. | 55/68 |
| 3,956,128 | 5/1976 | Turner | 210/150 |

FOREIGN PATENT DOCUMENTS

| | | | |
|---|---|---|---|
| 827539 | 2/1960 | United Kingdom | 55/90 |
| 1239744 | 7/1971 | United Kingdom | 55/90 |

*Primary Examiner*—Robert H. Spitzer
*Attorney, Agent, or Firm*—Louis Robertson

[57] ABSTRACT

A tower of contact media, having thereon bio-slimes kept wet and active by a recirculating nutrient liquid, and through which gases, such as foul air of a sewage treatment plant, pass for odor removal by biochemical action aided by liquid trickling downward through the media, and which may be conventional in many respects, is provided with:

(a) A gas recirculation system, i.e., means for drawing off gas which has passed once upwardly through the media and reintroducing it for passage through the media with raw incoming gases so that on the average the gases have more than one passage through the media, (b) Means for distributing on a layer of the media higher than the usual recirculation of liquid a solution such as hypochlorite for removal of residual odors left or caused by the recirculating liquid, and (c) Successive sections of media of differing coarseness.

4 Claims, 1 Drawing Figure

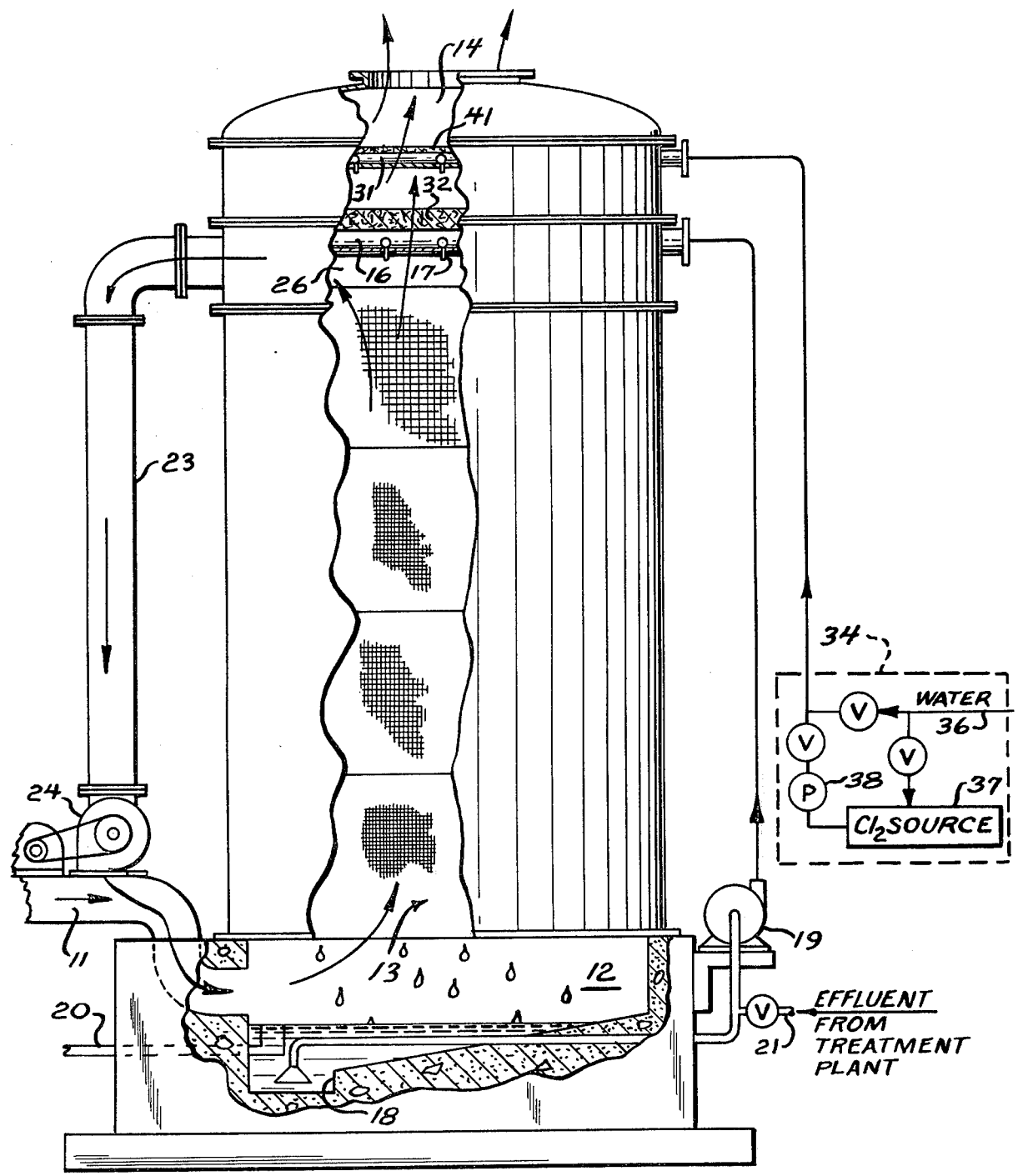

4,421,534

TOWER FOR REMOVING ODORS FROM GASES

This is a continuation of application Ser. No. 482,484 filed June 24, 1974, now abandoned.

INTRODUCTION

The invention of which the present disclosure is offered for public dissemination if adequate patent protection is available relates to towers for removing odors from gases by passing the gases through biochemical contact media. Odor removal of this general type has been known heretofore, and the present invention is for improving the efficiency and effectiveness of such removal.

The present invention provides two cooperative improvements as compared to the prior odor-removal apparatus and method. According to one improvement, gas recirculation is added. In other words, gas which has passed upwardly through the media is drawn off and returned to the incoming raw gas stream so as to pass through the media again. Thus the recirculated gas is given a second chance to contact the media. The average number of passes of the gas through the media is greater than one, the proportion by which it is greater depending upon the ratio of the volume of recirculation gas to the volume of raw gas.

The second improvement is to pass the outflowing gas through a layer of media on which clean odor-removing liquid has been distributed. In case any traces of odor characteristic of a particular tower would otherwise be present in the discharged gases, conceivably intensified by the repeated passage of the gases through the tower as the result of the aforementioned first improvement, such characteristic trace odor is removed by the passage of the gas through this additional layer of media wet with fresh or clean liquid.

The objects and advantages of the invention may be more apparent from the following description and from the drawing.

DESIGNATION OF THE DRAWING

The single FIGURE of the drawing is largely diagrammatic and as to the tower itself represents a side elevation of the tower with a portion of the shell broken away for illustration of the internal arrangement and the media of the tower.

INTENT CLAUSE

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

BACKGROUND DESCRIPTION

In some respects the odor removal tower of the present invention is conventional. Thus foul air or other odor-bearing gas is supplied through an inflow conduit 11 to an entry chamber 12 from which the gas flows upwardly through the media column generally designated 13 to a discharge chamber or passage 14 which could open directly to the atmosphere but may alternatively open to a discharge conduit, not shown. A manifold 16 provided with a multiplicity of spray heads 17 sprays a treatment liquid onto an upper layer of the media 13, said liquid trickling through the entire bed of media where it is contacted by the upwardly flowing gas. After trickling through the media 13, the liquid gathers in a sump 18 from which it is drawn by a pump for recirculation through the manifold 16. There is constant overflow through an overflow outlet 20, an excess of nutrient liquid being supplied by a feed conduit 21.

As heretofore, it is preferred that the recirculating liquid be supplied and continually replenished by feed from the treatment plant effluent, such effluents commonly containing some food supply for odor-removing microorganisms which grow or accumulate as a bio-mass or bio-slime on the media. The effluent from sewage treatment plants has been found to be excellent for keeping the bio-mass active.

GAS RECIRCULATION SYSTEM

According to one aspect of the invention, a gas recirculation system is added as represented by conduit 23 and blower 24. The conduit 23 draws gas from a chamber 26 above the main media column 13, this chamber conveniently being that in which the manifold 16 is located. The blower 24 discharges the recirculating gas into the inflow conduit 11, or directly into the entry chamber 12, whichever may be more convenient. Gas is preferably recirculated at something like twice the rate of expected normal-maximum inflow of raw gas. With the recirculation at the rate of twice the raw inflow, gas will on the average pass through the contact column 13 three times. In some respects the result is very similar to having a contact tower three times as high. Accordingly, the gas recirculation makes practicable the avoidance of the high, somewhat objectionable, columns heretofore used. Another advantage of the gas recirculation is in increasing the rate of flow of gas in the tower with greater beneficial turbulence and greater certainty of keeping all passages in the media open.

SUPPLEMENTAL TREATMENT WITH OXIDANT

According to another aspect of the invention, the treated gas or air which is about to be discharged is first subjected to a "clean-up" treatment with a chemically active odor-removing liquid such as an aqueous solution of a strong oxidant (e.g. hydrogen peroxide, sodium hypochlorite, or other forms of chlorine). Thus, as illustrated in the drawing, a secondary manifold 41 may spray the solution on a relatively thin layer 32 of media through which the gas about to be discharged passes. A suitable thickness for this layer is four inches.

The hypochlorite solution may be supplied by a generator 34 of any known type, e.g. an electrolytic sodium hypochlorite generator. Generator 34 may have a clear water supply 36 which may be discharged through the manifold 31 by pump 38. The amount of hypochlorite supplied is preferably not more than slightly in excess of the demand, so that the liquid which drops from the supplemental media layer 32 to the main media column 13 will not contain enough hypochlorite to deleteriously affect the bio-mass on the main media column 13. There may be a slight chlorine smell in the discharging air or gas, but to most people it resembles the smell of freshly laundered clothes derived from bleach and partly because it quickly dissipates. If in any instance an objectionably excessive chorine odor cannot be eliminated by reducing the quantity of hypochlorite supplied, the discharging gas can be passed through a four-inch bed of carbon granules. In the drawing, the layer 41 can be taken as representing either such a charcoal layer or a demisting layer, although both might be used.

Treatment of foul air or gases with sodium hypochlorite solution is not in itself new. So far as known, however, its use as a clean-up supplement following biochemical contact treatment is new. This combination yields a more reliably adequate removal of odor than either treatment alone. One fault of the biochemical treatment has been a tendency for it to impart its own slight odor, usually a musty odor, and that tendency is substantially overcome by the clean-up treatment with chlorine water or a strong oxidant.

MIXTURE OF FINE AND COARSE MEDIA

It is at present preferred that the successive zones of media in the column 13 be alternately fine and coarse media as illustrated. It is expected that the varied degrees of turbulence will be beneficial and results in redistributing the gas flow which tends to channel when flowing through a single size media. This will ensure relatively full use of all the media present so that there can be as much effective use of the lesser total contact area as if greater contact area were provided by using fine media exclusively, and at greater expense.

ACHIEVEMENT

The removal of odors from foul air by a combination of a main or primary treatment by biochemical contact media wet with an odor-removing solution is expected to do a more dependably thorough job of removal of odors than has been accomplished heretofore by equivalent biochemical reaction or by treatment with oxidants or hypochlorite, alone. Often the odor removal heretofore has been only about 90%, and in the case of obnoxious smells such as hydrogen sulphide, that is often not acceptable. With modern trends of community growth rarely permitting the location of a sewage treatment plant at a point remote from human life, a reliable removal of sewage treatment odors has become of great importance. The present invention is deemed a substantial step forward in providing such reliable odor removal.

The lack of isolation of sewage treatment plants also increases the importance of the gas recirculation features of the present invention, by making unsightly tall towers unnecessary. With a low, unnoticeable tower, satisfactory odor removal can be achieved according to the present invention. With both the recirculation feature and the supplemental clean-up, an unobtrusive low tower can give better odor removal than was heretofore available from a tall unsightly tower. The compactness of the tower also tends to make practicable the use in its manufacture of a shell of reinforced plastic such as fiber-glass. In that event, the recirculation duct 23 may conveniently be a lob along the side of the tank, and the panel separating it from the media chamber may be thinner than the outer walls.

The exact nature of the biochemical odor removal used here need not be explained, being already known. It apparently involves both adsorption and absorption. As a result of the sorption the odor-imparting constituents are metabolized or converted by the biochemical action of the bio-slimes. For example, $H_2S$ is broken down to form water and colloidal sulphur.

The preferred media is a known plastic type comprising vertical undulated sheets forming a multitude of passages between them, and providing a great amount of surface area for bio-slime growth. The media for the coarse sections is sold as having 60 square feet of exposed surface per cubic foot; that for fine sections, 90 square feet. These figures are given as illustrative, inasmuch as choices, and even different types of media, might work as well.

I claim:
1. The method of removal of odor from gas including passing the gas through a column of contact media while trickling through the column a liquid promoting growth of bio-slimes, characterized in that said method includes:
    (a) the step of recirculating a portion of the gas which has passed upwardly through the column, by passing it through the same column again whereby on the average repeated flow of the gas through the same media is provided;
    (b) and distributing to media so positioned in the column that the gas passes through it, after passing through and leaving the portion through which said recirculated liquid trickles, a fresh, nonrecirculated chemically active odor-removal liquid.

2. The method of removal of sewage treatment odor from gas including passing the gas through a column of contact media while trickling through the column a liquid recirculated from a previous trickling through the column and which is suitable for promoting growth of bio-slimes, characterized in that said method includes:
    (a) distributing to media so positioned in and above the column that the gas passes through it after passing through and leaving the portion through which said recirculated liquid trickles, a fresh nonrecirculated chemically active odor-removal liquid including a material, namely hypochlorite, which is harmful to said bio-slimes; the quantity of said hypochlorite being approximately equal to the demand therefor by the gas leaving said portion, so that the liquid which drops to said portion will not contain enough hypochlorite to significantly and deleteriously affect the bio-slimes.

3. The method of removal of odor from gas including passing the gas through a column of contact media bearing odor-removing bio-slimes while trickling through the column a liquid promoting growth of bio-slimes, characterized in that said method includes:
    (a) the step of drawing off a portion of the gas which has passed upwardly through said column, and recirculating this portion by passing it through the same column again for repeated contact of the gas with the same bio-slimes;
    (b) and distributing to additional media, so positioned above said column that another portion of the gas which has passed through said column passes through said additional media after the portion of gas to be recirculated has been withdrawn from it, a fresh, nonrecirculated chemically active odor-removal liquid.

4. Apparatus for removal of odor from gases including a column of contact media having at least 60 square feet of contact surface per cubic foot of media, a housing surrounding said column and providing a gas entry chamber, a gas discharge passage and a sump, and distribution means for distributing over a cross-section of the media at a high level thereof a liguid promoting the growth of bio-slimes for trickling through the column to the sump, characterized in that:
    the contact media has successive sections, two of relatively fine media, and one between them of relatively coarse media of the same nature.

* * * * *